(12) United States Patent
Di Gennaro

(10) Patent No.: US 7,527,047 B2
(45) Date of Patent: May 5, 2009

(54) REGULATOR THERMOSTAT SUPPORT OF HEAT ENGINE WITH EXTERNAL HOT WATER CIRCUIT

(76) Inventor: Antoine Di Gennaro, 17 avenue Général Pruneau, F-83000, Toulon (FR)

( * ) Notice: Subject to any disclaimer, the term of this patent is extended or adjusted under 35 U.S.C. 154(b) by 561 days.

(21) Appl. No.: 10/860,048

(22) Filed: Jun. 4, 2004

(65) Prior Publication Data

US 2006/0150957 A1   Jul. 13, 2006

Related U.S. Application Data

(63) Continuation of application No. PCT/FR02/03705, filed on Oct. 29, 2002.

(30) Foreign Application Priority Data

Dec. 7, 2001   (FR) .................................. 01 15822

(51) Int. Cl.
*F02M 21/04* (2006.01)
(52) U.S. Cl. ............................................ 123/557
(58) Field of Classification Search ......... 123/543–557, 123/DIG. 13
See application file for complete search history.

(56) References Cited

U.S. PATENT DOCUMENTS 3,201,934 A * 8/1965 Smith .......................... 60/320
4,527,533 A * 7/1985 Laramee .................... 123/557
5,483,943 A   1/1996 Peters
5,488,937 A * 2/1996 Kuze ......................... 123/552
5,611,392 A * 3/1997 Malecek et al. ............... 165/47
6,026,789 A   2/2000 Arai et al.
6,708,674 B2 * 3/2004 Benson ...................... 123/557

FOREIGN PATENT DOCUMENTS

FR   2757217   6/1998

* cited by examiner

*Primary Examiner*—M. McMahon
(74) *Attorney, Agent, or Firm*—Greenblum & Bernstein, P.L.C.

(57) ABSTRACT

The invention concerns a regulator thermostat support of heat engine with external hot water circuit, consisting of a specific regulator thermostat housing support (11) replacing the existing support and comprising means (12, 13) for mounting a double branch pipe connecting said support to a liquefied gas vaporization system or to another calorie consuming equipment. Said branch pipe constitutes a bypass for the engine coolant and the regulator thermostat support being designated so that the flow rate in said branch tube is controlled by the regulator thermostat. It serves to ensure preheating of liquefied gas (LPG), or other fuel, used in a particular for marine engines of all types, tow- or four-stroke, carburetor or injection, outboard or inboard, but which can also be used for land engines or for other applications.

4 Claims, 2 Drawing Sheets

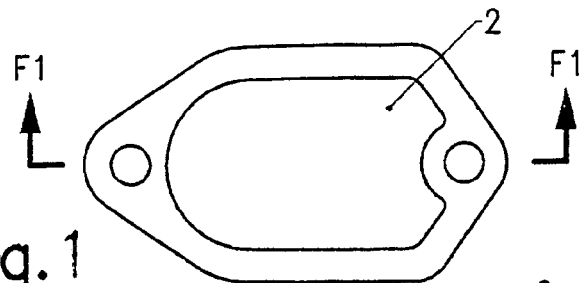
Fig. 1
PRIOR ART
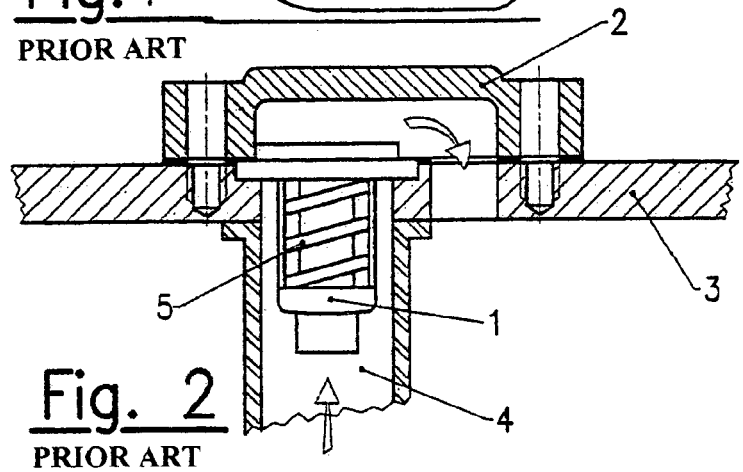
Fig. 2
PRIOR ART
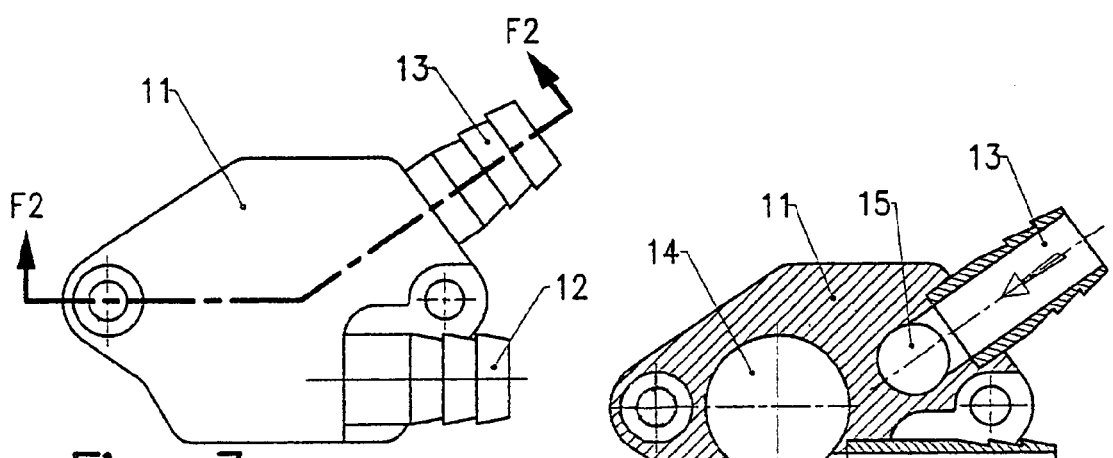
Fig. 3
Fig. 5
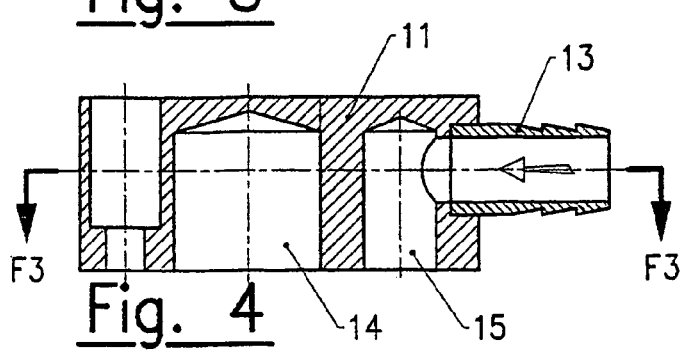
Fig. 4

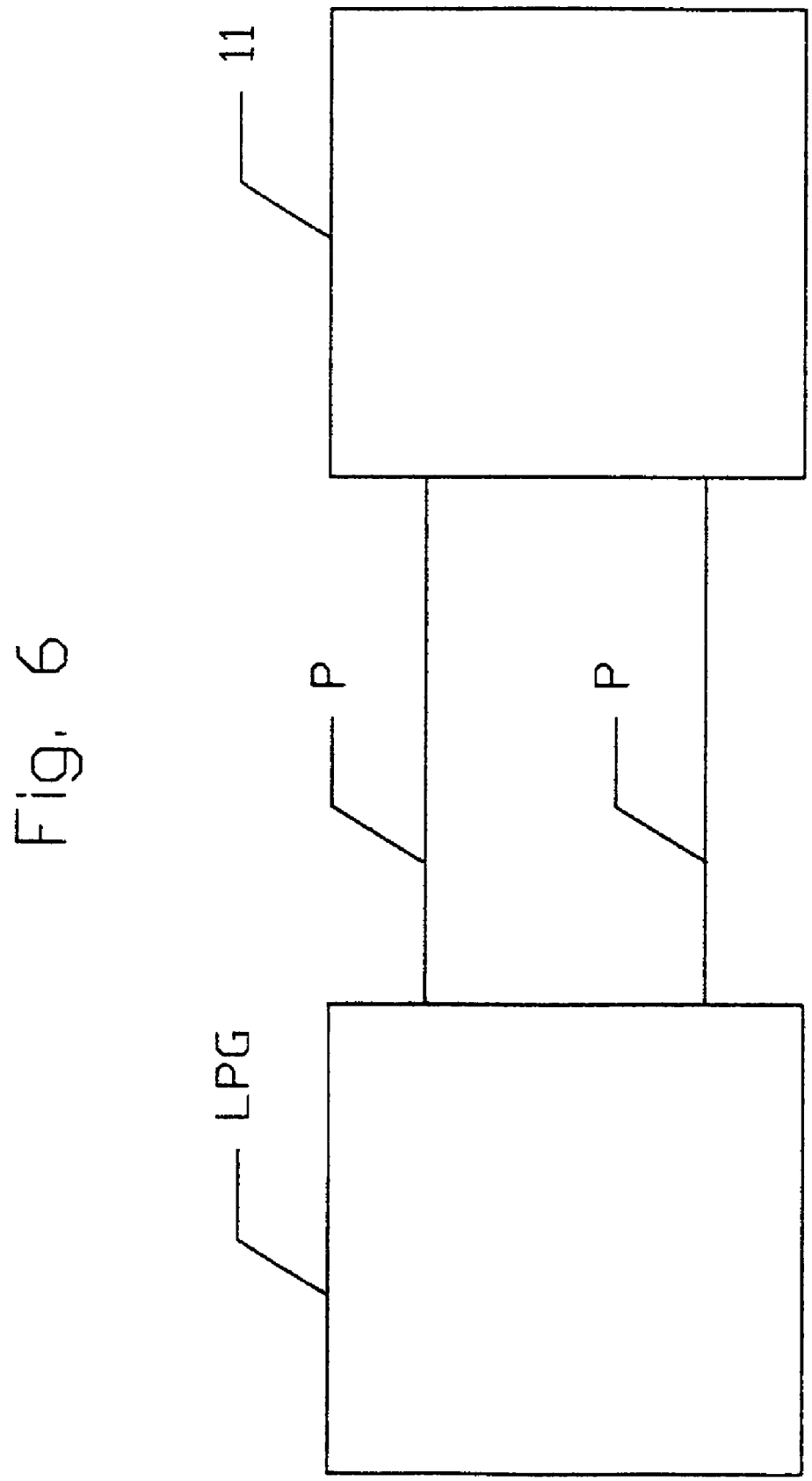

REGULATOR THERMOSTAT SUPPORT OF HEAT ENGINE WITH EXTERNAL HOT WATER CIRCUIT

CROSS-REFERENCE TO RELATED APPLICATIONS

The present application is a Continuation of International Patent Application No. PCT/FR02/03705 filed Oct. 29, 2002 which published as WO 03/048556 on Jun. 12, 2003, and claims priority of French Patent Application No. 01/15822 filed Dec. 7, 2001. Moreover, the disclosure of International Patent Application No. PCT/FR02/03705 is expressly incorporated by reference herein in its entirety.

BACKGROUND OF THE INVENTION

1. Field of the Invention

The present invention relates to calorstat support of heat engine having an external hot water circuit.

It is adapted to provide the necessary calories for the preheating of liquefied petroleum gas (LPG), or other fuel, used in particular for marine engines of all types, two- or four-stroke, carburetor or injection, outboard or inboard, but which can also be used for land engines or for other applications.

2. Discussion of Background Information

Liquefied petroleum gas is increasingly used as a source of energy for internal combustion engines. This fuel has the advantage of producing only very low pollution and is subject to a more advantageous taxation than that applied to other fuels.

Using liquefied gas to operate an engine initially designed to receive a liquid fuel requires a special device ensuring the vaporization of the gas under pressure and at a predetermined flow rate.

This device is in the form of a housing comprising a double enclosure formed of a chamber for vaporizing the gas, and of a thermal chamber in which a hot liquid circulates, which is generally constituted by the engine cooling water collected due to a branch provided on the circuit connecting the latter to the radiator.

The so-called water-cooled engines comprise an impervious closed circuit containing an aqueous solution containing anticorrosion additives and antifreeze. The cooling liquid is heated within the engine gearbox unit itself. It is then pumped to the upper portion of a water-air exchanger called the radiator and, after cooling, is returned to the engine. Its flow rate is controlled by a direct-action thermostat, i.e., a calorstat, located at the outlet of the engine gearbox unit, which shuts the circuit, when cold, in order to accelerate the heating of the liquid, at the start, until reaching its optimum temperature, and which then opens up to maintain this temperature constant.

The calorstat 1 is mounted on a support 2 attached to the engine gearbox unit 3 and communicating with the backflow pipe 4 of the water pump. It comprises a deformable bulb having a bellow and a spring 5, on the side of the pump, which controls the valve of an elementary cock (FIGS. 1 and 2). When cold, this cock is closed. When the engine starts to run, the temperature of the water for cooling the engine gearbox unit rises quickly, in the absence of any circulation. When the normal water temperature is reached, the cock opens up and initiates the water circulation in closed circuit, via the radiator. Thereafter, the opening is modified automatically as a function of the load of the engine and operating conditions of the radiator.

There are several known devices that use the engine cooling liquid to ensure the preheating of the liquefied petroleum gas. By way of example, Patent No. FR 2 757 217 describes a housing for vaporizing liquefied gas comprising, within the thermal chamber, a container or tubular circuit connected to the engine cooling water intake and outlet.

It takes a fairly a long time for the cooling liquid to reach the necessary temperature for vaporizing the liquefied gas, particularly in cold weather. Moreover, this temperature varies as a function of the engine speed.

SUMMARY OF THE INVENTION

The device according to the present invention overcomes these drawbacks. Indeed, it can be installed easily and quickly on an existing liquefied gas vaporizer and makes it possible to have a heat source with constant temperature for preheating the liquefied gas.

The invention provides for a specific calorstat support which replaces the existing support and which includes an arrangement for mounting a double branch pipe connecting the support to a liquefied gas vaporization system or to another calorie consuming device. The branch pipe constitutes a bypass for the engine coolant and the calorstat support is arranged so that the flow rate in this branch pipe is controlled by the calorstat.

The invention also provides for a thermostat or calorstat support device for a heat engine having an external hot water circuit, wherein the support device comprises a support housing. A connecting arrangement connects the support housing to a calorie consuming arrangement. The support housing is arranged to allow a controlled flow through the connecting arrangement.

The support housing may be arranged to allow a controlled flow via a thermostat through the connecting arrangement. The support housing may be structured and arranged to provide calories for preheating a fuel. The fuel may comprise liquefied petroleum gas (LPG). The heat engine may comprise one of a marine engine and a land engine.

The support device may further comprise a double branch pipe, wherein the double branch pipe is connected to each of the connecting arrangement and the calorie consuming arrangement.

The calorie consuming arrangement may comprise a liquefied gas vaporization system. The support housing may comprise a base which is mountable to a heat engine after removal of a different support housing, whereby a base of the different support housing is identical to the base of the support housing. The connecting arrangement may comprise an outlet end piece and a return end piece, whereby the outlet and return end pieces are each connectable to a tube is connectable to a thermal chamber of the calorie consuming arrangement.

The support housing may further comprise two imperviously separated compartments. One of the two imperviously separated compartments may comprise an outlet compartment and another of the two imperviously separated compartments may comprise a return compartment. In an installed position on the heat engine, the outlet compartment is located behind a thermostat and communicates with each of a cock of the thermostat and the outlet end piece. In an installed position on the heat engine, the return compartment communicates with each of an enclosure of the heat engine and the return end piece.

The support device in combination with a bypass arranged between an outlet circuit and an return circuit connected to the support housing, whereby the bypass is adapted to eliminate external circulation of the heat engine coolant irrespective of a state of a thermostat of the heat engine. The bypass is arranged internally within the support housing. The bypass is arranged outside of the support housing.

The support housing may be made of a light cast alloy. The support housing may be made of a heat resistant synthetic material.

The invention also provides for a method of moving heat engine coolant from a heat engine to a calorie consuming device using the support housing described above, wherein the method comprises mounting the support housing to the heat engine so that the support housing covers a thermostat, passing the heat engine coolant by the thermostat mounted to the heat engine, through a first compartment of the support housing, and out through an outlet end piece of the support housing, supplying the heat engine coolant from the outlet end piece to the calorie consuming device, supplying the heat engine coolant from the calorie consuming device to a return end piece of the support housing, and passing the heat engine coolant through a second compartment of the support housing and into the heat engine, wherein the thermostat is arranged to allow a controlled flow of the heat engine coolant, and wherein the first and second compartments are imperviously separated from each other.

The invention also provides for a system for connecting a LPG device to a heat engine having a thermostat, wherein the system comprises a support housing comprising first and second imperviously separated chambers, first and second connecting pieces, and openings for mounting the support housing to the heat engine. The first connecting piece is in fluid communication with the first imperviously separated chamber and the second connecting piece being in fluid communication with the second imperviously separated chamber. The support housing is structured and arranged to cover the thermostat of the heat engine when the support housing is installed on the heat engine.

The invention also provides for a method of moving heat engine coolant from a heat engine to an LPG device using the system described above, wherein the method comprises passing the heat engine coolant by a thermostat mounted to the heat engine, through the first imperviously separated chamber, and out through the first connecting piece, supplying the heat engine coolant from the first connecting piece to the LPG, supplying the heat engine coolant from the LPG device to the second connecting piece, and passing the heat engine coolant through the second imperviously separated chamber and into the heat engine, wherein the thermostat is arranged to allow a controlled flow of the heat engine coolant.

The invention also provides for a system comprising a LPG device, a heat engine having a thermostat, a support housing comprising first and second imperviously separated chambers, first and second connecting pieces, and openings for mounting the support housing to the heat engine. The first connecting piece is in fluid communication with the first imperviously separated chamber and the second connecting piece being in fluid communication with the second imperviously separated chamber. Pipes connect the first and second connecting pieces to the LPG device. The support housing covers the thermostat of the heat engine when the support housing is installed on the heat engine.

The invention also provides for a method of moving heat engine coolant from a heat engine to an LPG device using the system described above, wherein the method comprises passing the heat engine coolant by the thermostat mounted to the heat engine, through the first imperviously separated chamber, and out through the first connecting piece, supplying the heat engine coolant from the first connecting piece to the LPG devie via one of the pipes, supplying the heat engine coolant from the LPG device to the second connecting piece via another of the pipes, and passing the heat engine coolant through the second imperviously separated chamber and into the heat engine, wherein the thermostat is arranged to allow a controlled flow of the heat engine coolant.

BRIEF DESCRIPTION OF THE DRAWINGS

In the annexed drawings, provided by way of a non-limiting example of embodiment according to the present application wherein:

FIGS. 1 and 2 show a calorstat support of a known type, seen from the top and in cross-section, respectively, along the arrows F1;

FIG. 3 is a top view of the calorstat support according to the invention;

FIG. 4 is a cross-section along the arrows F2 of FIG. 3;

FIG. 5 is a cross-section along the arrows F3 of FIG. 4; and

FIG. 6 shows schematically the LPG device connected to the support housing via pipes.

DETAILED DESCRIPTION OF THE PRESENT INVENTION

The device shown in FIGS. 3-5 is constituted of a housing 11 for supporting the calorstat 1, and includes an outlet end piece 12 and a return end piece 13 that allows for the coupling two tubes adapted to connect the support housing 11 to the thermal chamber of the system for vaporizing the liquefied petroleum gas.

The support housing 11 is provided with a base that is identical to that of the normal support 2, making it possible to mount it instead of the latter. Arranged on the inside, the housing 11 comprises two imperviously separated compartments 14 and 15. An outlet compartment 14 is located behind the calorstat 1 and communicates with the cock of the latter, as well as with the outlet end piece 12. A return compartment 15 communicates with the enclosure of the engine gearbox unit 3 and the return end piece 13.

The support housing 11 is preferably made of light cast alloy, but can be made of any other suitable material, in particular, the housing 11 can be made of a heat resistant synthetic material.

For certain applications, it is possible to provide a bypass which is internal to or external to the support housing 11, and which is arranged between the outlet circuit and the return circuit. This makes it possible to isolate the device by eliminating the external circulation of the coolant, irrespective of the state of the calorstat 1.

The system does not hinder the functioning of the engine in any way. At the start, the calorstat 1 is closed and prevents any fluid circulation in the branch pipes connected to the outlet and return end pieces 12, 13, and the temperature of the liquefied petroleum gas is raised by a preheating system which can be, for example, an electric system.

When the coolant is sufficiently hot, the calorstat opens up and allows the circulation of the fluid inside the circuit that is external to the support housing 11, and the calories collected by the liquefied gas vaporization system will have the effect of improving the efficiency of the engine cooling system.

FIG. 6 shows an the LPG device connected to the support housing 11 via the double branch pipe or pipes P to as to provide heat engine coolant to the LPG device.

The positioning of the various constituent elements provides the invention with a maximum of useful effects which had not, to date, been obtained by similar devices.

The invention also provides for a method of moving heat engine coolant from a heat engine 3 to a calorie consuming device LPG using the support housing 11 described above. The method comprised mounting the support housing 11 to the heat engine 3 so that the support housing 11 covers a thermostat 1, passing the heat engine coolant (see arrows in FIG. 2) by the thermostat 1 mounted to the heat engine 3, through a first or outlet compartment 14 of the support housing 11, and out through an outlet end piece 12 of the support housing 11, supplying the heat engine coolant from the outlet end piece 12 to the calorie consuming device LPG (via one of the pipes P in FIG. 6), supplying the heat engine coolant from the calorie consuming device LPG to a return end piece 13 of the support housing 11 (via the other of the pipes P in FIG. 6), and passing the heat engine coolant through a second of return compartment 15 of the support housing 11 and into the heat engine 3. The thermostat 1 is arranged to allow a controlled flow of the heat engine coolant. The first and second compartments 14, 15 are imperviously separated from each other.

The invention claimed is:

1. A thermostat or calorstat support device for a heat engine having an external hot water circuit, the support device comprising:
    a support housing structured and arranged to be mounted to a portion of the heat engine having a thermostat;
    a connecting arrangement connecting the support housing to a calorie consuming arrangement; and
    two imperviously separated compartments,
    wherein the support housing is arranged to allow a controlled flow through the connecting arrangement,
    wherein the connecting arrangement comprises an outlet end piece and a return end piece, whereby the outlet and return end pieces are each connectable to a tube that is connectable to a thermal chamber of the calorie consuming arrangement,
    wherein one of the two imperviously separated compartments comprises an outlet compartment and another of the two imperviously separated compartments comprises a return compartment, and
    wherein, in an installed position on the heat engine, the outlet compartment is located behind the thermostat and communicates with each of a cock of the thermostat and the outlet end piece.

2. A method of moving heat engine coolant from a heat engine to a calorie consuming device using a support device comprising a support housing structured and arranged to be mounted to a portion of the heat engine having a thermostat, and a connecting arrangement connecting the support housing to a calorie consuming arrangement, wherein the support housing is arranged to allow a controlled flow through the connecting arrangement, the method comprising:
    mounting the support housing to the heat engine so that the support housing covers the thermostat;
    passing the heat engine coolant by the thermostat mounted to the heat engine, through a first compartment of the support housing, and out through an outlet end piece of the support housing;
    supplying the heat engine coolant from the outlet end piece to the calorie consuming device;
    supplying the heat engine coolant from the calorie consuming device to a return end piece of the support housing; and
    passing the heat engine coolant through a second compartment of the support housing and into the heat engine,
    wherein the thermostat is arranged to allow a controlled flow of the heat engine coolant, and
    wherein the first and second compartments are imperviously separated from each other.

3. A method of moving heat engine coolant from a heat engine to an LPG device using a system for connecting the LPG device to a heat engine having a thermostat, the system comprising a support housing comprising first and second imperviously separated chambers, first and second connecting pieces, and openings for mounting the support housing to the heat engine and the first connecting piece being in fluid communication with the first imperviously separated chamber and the second connecting piece being in fluid communication with the second imperviously separated chamber, wherein the support housing is structured and arranged to cover the thermostat of the heat engine when the support housing is installed on the heat engine, the method comprising:
    passing the heat engine coolant by a thermostat mounted to the heat engine, through the first imperviously separated chamber, and out through the first connecting piece;
    supplying the heat engine coolant from the first connecting piece to the LPG;
    supplying the heat engine coolant from the LPG device to the second connecting piece; and
    passing the heat engine coolant through the second imperviously separated chamber and into the heat engine,
    wherein the thermostat is arranged to allow a controlled flow of the heat engine coolant.

4. A method of moving heat engine coolant from a heat engine to an LPG device using a system comprising an LPG device, a heat engine having a thermostat, a support housing comprising first and second imperviously separated chambers, first and second connecting pieces, and openings for mounting the support housing to the heat engine, the first connecting piece being in fluid communication with the first imperviously separated chamber and the second connecting piece being in fluid communication with the second imperviously separated chamber, and pipes connecting the first and second connecting pieces to the LPG device, wherein the support housing covers the thermostat of the heat engine when the support housing is installed on the heat engine, the method comprising:
    passing the heat engine coolant by the thermostat mounted to the heat engine, through the first imperviously separated chamber, and out through the first connecting piece;
    supplying the heat engine coolant from the first connecting piece to the LPG device via one of the pipes;
    supplying the heat engine coolant from the LPG device to the second connecting piece via another of the pipes; and
    passing the heat engine coolant to pass through the second imperviously separated chamber and into the heat engine,
    wherein the thermostat is arranged to allow a controlled flow of the heat engine coolant.

* * * * *